United States Patent Office 2,931,803
Patented Apr. 5, 1960

2,931,803

FLUOROCARBON METALLOID COMPOUNDS OF TETRAFLUOROETHYLENE AND SULFUR, SELENIUM OR PHOSPHORUS AND THEIR PREPARATION

Carl G. Krespan, Wilmington, Del., assignor to E. I. du Pont de Nemours and Company, Wilmington, Del., a corporation of Delaware No Drawing. Application August 15, 1957
Serial No. 678,451

14 Claims. (Cl. 260—239)

This invention relates to new fluorocarbon metalloid compounds and to a method for their preparation. More particularly, this invention relates to new organic fluoro compounds containing selected metalloid atoms, and to a method of preparing these compounds.

This application is a continuation-in-part of my copending application Serial No. 595,126, filed July 2, 1956, now abandoned.

Tetrafluoroethylene is a well known compound which is used in the chemical industry for various purposes including use as a reactant for preparing many industrially useful monomeric and polymeric products. However, it has not heretofore been possible to effect a direct combination of tetrafluoroethylene with solid metalloids, such as sulfur, selenium or phosphorus, to obtain compounds containing tetrafluorethylene units interrupted by metalloid atoms.

It is an object of this invention to provide new fluorocarbon metalloid compounds and a novel process for their preparation. A further object is to provide new heterocyclic organic fluoro compounds containing selected metalloid atoms. A still further object is to provide a novel process for effecting a direct combination of tetrafluoroethylene with one of the solid metalloids sulfur, selenium and phosphorus. Another object is to obtain heterocyclic compounds containing tetrafluoroethylene units interrupted by metalloid hetero atoms. Other objects will appear hereinafter.

These and other objects of this invention are accomplished by providing new fluorocarbon metalloid compounds which are the reaction products obtained by heating at a temperature of at least 125° C. an intimate mixture of tetrafluoroethylene, iodine, and one of the metalloid elements sulfur, selenium and phosphorus until a fluorocarbon compound containing the said metalloid element in chemical combination is obtained. These resulting fluorocarbon metalloid compounds are novel heterocyclic compounds, which are five- to six-membered heterocyclic compounds having as sole ring members the carbon atoms of two tetrafluoroethylene, —CF$_2$—CF$_2$—, groups and from one to two hetero atoms, which are sulfur, selenium or phosphorus, said hetero atoms being attached by two valences to the tetrafluoroethylene groups and separating these groups at least at one end, any remaining valence of the hetero atom being satisfied by iodine. These fluorocarbon metalloidal heterocyclic compounds have the structural formula:

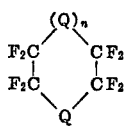

wherein Q is sulfur, selenium or phosphorus, n is a cardinal number from 0 to 1, and when Q is phosphorus, its third valence is satisfied by iodine.

When the hetero atom is sulfur, the novel compounds are fluorocarbon sulfur heterocyclic compounds having the formula:

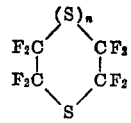

wherein n is a cardinal number from 0 to 1. There are two specific fluorocarbon sulfur heterocyclic compounds as follows:

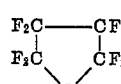 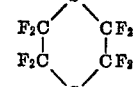

Perfluorothiolane    Perfluoro-1,4-dithiane

When the heteroatom is selenium, the novel compounds are fluorocarbon selenium heterocyclic compounds having the formula:

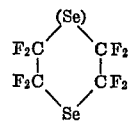

wherein n is a cardinal number from 0 to 1. There are two specific fluorocarbon selenium heterocyclic compounds as follows:

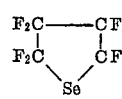 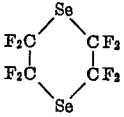

Perfluoroselenolane    Perfluoro-1,4-diselenane

When the heteroatom is phosphorus, the novel compounds are fluorocarbon phosphorus heterocyclic compounds having the formula:

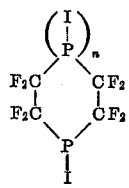

wherein n is a cardinal number from 0 to 1. There are two specific fluorocarbon phosphorus heterocyclic compounds as follows:

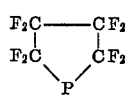 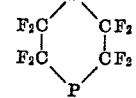

Octafluoro-1-iodo-    Octafluoro-1,4-diiodo-
phospholane          1,4-diphosphane The products of this invention are prepared by heating together tetrafluoroethylene; one of the elements: sulfur, selenium or phosphorus (these elements being hereinafter called hetero elements for the sake of brevity); and iodine.

The presence of iodine as a reaction catalyst is not essential when using sulfur or selenium, since the formation of heterocyclic fluoro compounds will proceed without it. Nevertheless, it is preferred to use iodine, particularly when the reaction is carried out without the use of a solvent or diluent, in which case only very small amounts of heterocyclic, reaction products are formed unless iodine is present in the reaction mixture.

When sulfur or selenium is the hetero element, iodine is a catalyst in the reaction and need only be used in catalytic amounts, e.g., as little as 0.001 mole of iodine per mole of hetero element is sufficient. When phosphorus is the hetero element, iodine is a necessary reactant as well as a catalyst and it is desirably used in larger amounts, e.g., 0.5 mole of iodine per mole of phosporus, and this can also be done, if desired, when sulfur or selenium are used. In general, a suitable amount of iodine is from 0.005 to 0.4 mole per mole of hetero element.

The relative proportions of tetrafluoroethylene and hetero element are not critical. Normally, there is used between 0.5 and 5 moles of tetrafluoroethylene per gram/atom of hetero element.

The reaction proceeds at an impractically slow rate at temperatures below about 125° C. and it is therefore desirable to operate at temperatures of at least 125° C., and preferably at least 150° C. While the reaction temperature can be as high as the decomposition point of reactants or reaction products, it is in general unnecessary to exceed about 350° C., the preferred range being 150–300° C. The reaction is carried out in pressure-resistant vessels and preferably under the autogenous pressure developed by the reactants and reaction products at the operating temperature, although an additional pressure of either tetrafluoroethylene or an inert gas can be used if desired. The total pressure is not critical and it can be as high as the equipment will tolerate. For example, it can be as high as 5000 atmospheres, or even higher.

While the reaction products are formed at any temperature above 125° C., the amount of the products formed depends in part on the reaction temperature, in part on the presence or absence of a solvent or diluent, and in part on the amount of iodine present. When sulfur is the hetero element and no solvent is present, the use of the lower temperature range, e.g., 125–200° C., yields the heterocyclic products only in small amounts. At higher temperatures, e.g., in the 200–300° C. range, on the other hand, the heterocyclic products are formed in much larger quantities. The presence of a solvent or diluent favors the formation of these products, which can then be obtained in practical yields even in the lower temperature range, e.g., 125–200° C. Using no iodine, or from 0.001 to 0.1 mole of iodine per mole of sulfur and no solvent leads to poorer yields, which increase when a solvent is used, and still more when amounts of iodine in excess of 0.1 mole per mole of sulfur are used.

When selenium or phosphorus is the hetero atom, use of a solvent or diluent permits practical operation at a lower temperature, e.g., 125–200° C., than is possible in its absence, when temperatures in the range of 200–300° C. are recommended.

If desired, although this is not essential, the tetrafluoroethylene can be stabilized against polymerization by addition of a small amount of one of the known inhibitors, for example those described in U.S. Patents 2,407,396, 2,407,405 and 2,407,419.

Suitable reaction media, when one is used, include heat-stable, unpolymerizable, essentially neutral liquids, capable of dissolving the metalloid used to the extent of at least 0.5% at the operating temperature. If side reactions are to be avoided, the solvent should be free from carbon-to-carbon unsaturation. Solvents containing carbon-to-carbon unsaturation, whether aliphatic, alicyclic or aromatic, can be used, but it has been found that such unsaturates react with tetrafluoroethylene and sulfur by adding the tetrafluoroethylenethio group, —$CF_2$—$CF_2$—S, at the site of the unsaturation. This reaction results in a decreased yield with respect to the products of this invention. Suitable solvents for use in this process include, for example, halogenated hydrocarbons such as chloroform, carbon tetrachloride, etc.; acyclic or cyclic ethers such as di-n-butyl ether, dioxane, tetrahydrofuran, etc.; carbon disulfide, dimethylformamide, and the like. Carbon disulfide is a particularly preferred solvent.

Contact between the reactants should be maintained at least long enough at operating temperature for a practical amount of reaction product to be formed. In practice, a reaction period of two to twelve hours is sufficient. The reaction products, which are volatile liquids, can be isolated by fractional distillation.

The most readily accessible and most useful products of this invention are those in which the hetero atom is sulfur, i.e., perfluorothiolane and perfluoro-1,4-dithiane.

The following examples illustrate the invention.

*Example I*

A mixture of 4.8 g. (0.15 mole) of sulfur, 1.27 g. (0.005 mole) of iodine, 30.3 g. (0.3 mole) of tetrafluoroethylene and 20 cc. of benzene was heated at 150° C. for 10 hours under autogenous pressure. Distillation of the liquid product gave a small amount of perfluorothiolane, B.P. 40–44° C.

*Analysis.*—Calc'd. for $C_4F_8S$: F, 65.49; S, 13.82. Found: F, 65.75; S, 13.58.

There was also obtained, in 3% conversion based on the sulfur, a product boiling at 95–100° C. at 4 mm. and melting at 72–73° C. after recrystallization from carbon tetrachloride, then from 95% ethanol. This product analyzed for $C_{10}H_6F_8S_2$.

*Analysis.*—Calc'd. for $C_{10}H_6F_8S_2$: C, 35.09; H, 1.77; F, 44.41; S, 18.74; M.W., 342. Found: C, 34.76; H, 2.12; F, 43.92; S, 18.92; M.W., 300.

Infrared analysis showed that hydrogen was present on saturated and unsaturated carbon, and that carbon-to-carbon unsaturation was present. Nuclear magnetic resonance analysis gave spectra consistent with a mixture of two of the following three compounds:

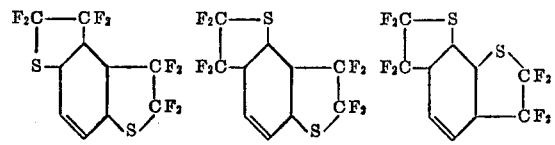

Theoretical considerations suggest that the first two structures are the most probable ones.

*Example II*

A mixture of 8 g. (0.25 mole) of sulfur, 0.13 g. (0.0005 mole) of iodine, 24.3 g. (0.24 mole) of tetrafluoroethylene and 20 cc. of carbon tetrachloride was heated at 150° C. for 4 hours under autogenous pressure. The liquid product on fractionation gave 4.3 g. (15% conversion based on the tetrafluoroethylene) of perfluorothiolane, B.P. 41° C., further identified by infrared analysis.

Perfluorothiolane was similarly obtained when the carbon tetrachloride solvent was replaced by 20 cc. of carbon bisulfide, other conditions being substantially the same.

*Example III*

A mixture of 16 g. (0.5 mole) of sulfur, 50.8 g. (0.2 mole) of iodine and 40 g. (0.40 mole) of tetrafluoroethylene was heated to 150° C. in a pressure vessel and 32 g. (0.32 mole) of additional tetrafluoroethylene was injected into the vessel. After 30 minutes at 150° C. the temperature was raised to 300° C. and another additional amount of 21 g. (0.21 mole) of tetrafluoroethylene was injected. After 8 hours at 300° C. the reaction was stopped. Distillation of the liquid reaction product gave 9.7 g. of perfluorothiolane and 29 g. (44% conversion based on the sulfur) or perfluoro-1,4-dithiane, B.P. 78–84° C. A sample of perfluoro-1,4-dithiane was purified by treatment with mercury, then with sodium, and redistillation. It boiled at 80° C.

*Analysis.*—Calc'd. for $C_4F_8S_2$: F, 57.54; S, 24.28. Found: F, 56.69; S, 24.33.

Example IV

A mixture of 7.8 g. (0.1 mole) of selenium, 12.7 g. (0.05 mole) of iodine and 25 g. (0.25 mole) of tetrafluoroethylene was heated at 250° C. under autogenous pressure for 7 hours. Distillation of the liquid reaction product gave 2.7 g. of perfluoroselenolane, B.P. 62° C.

*Analysis.*—Calc'd. for $C_4F_8Se$: F, 54.48; Se, 28.30. Found: F, 53.92; Se, 27.50.

A higher boiling fraction of the reaction product (B.P. 107–110° C.) which nuclear magnetic resonance analysis had shown in previous experiments to be a mixture of perfluoro-1,4-diselenane and 1,2-diiodotetrafluoroethane, was purified by dissolving it in anhydrous ether and treating the solution with magnesium turnings. Distillation of the ether solution gave 0.9 g. of perfluoro-1,4-diselenane, B.P. 108° C. Its identification and purity were confirmed by nuclear magnetic resonance analysis.

Example V

A mixture of 7.8 g. (0.25 mole) of red phosphorus, 25.4 g. (0.1 mole) of iodine and 50.8 g. (0.51 mole) of tetrafluoroethylene was heated at 220° C. for 8 hours under autogeneous pressure. There was obtained 39 g. of a mixture of liquid and solid reaction products. On distillation in a nitrogen atmosphere there was obtained 4.1 g. of a fraction boiling at 116–119° C. This was shown by nuclear magnetic resonance analysis to be somewhat impure octafluoro-1-iodophospholane, whose structure was further established as described below.

Sublimation of the distillation residue at 50° C. and 1 mm. pressure gave 14.9 g. of octafluoro-1,4-diiodo-1,4-diphosphane which, after being triturated with water and recrystallized from petroleum ether, melted at 73–75.5° C. Its identity was established by nuclear magnetic resonance analysis and compositional analysis.

*Analysis.*—Calc'd. for $C_4F_8P_2I_2$: P, 12.01; F, 29.47; I, 49.21. Found: P, 12.06; F, 29.26; I, 49.28.

The structure of the other reaction product, octafluoro-1-iodophospholane, was established by hydrolyzing the crude distillate to octafluorobutanephosphonous acid and oxidizing directly the hydrolysis product with hydrogen peroxide to octafluorobutanephosphonic acid, in accordance with the equations:

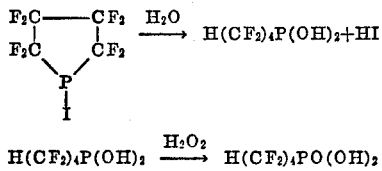

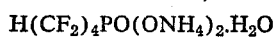

The octafluorobutanephosphonic acid, a viscous oil, was converted to the diammonium salt, $$H(CF_2)_4PO(ONH_4)_2 \cdot H_2O$$

whose composition was established by analysis.

*Analysis.*—Calc'd. for $C_4H_9F_8PO_3N_2 \cdot H_2O$: P, 9.27; F, 45.49; N, 8.39. Found: P, 9.26; F, 45.66; N, 8.60.

The following examples illustrate the reaction of tetrafluoroethylene with sulfur in the absence of added catalyst.

Example VI

A mixture of 8 g. (0.25 mole) of sulfur, 50 g. (0.5 mole) of tetrafluoroethylene containing a small amount of a polymerization inhibitor and 150 ml. of carbon disulfide was heated in a pressure vessel to 200° C. in 30 minutes and a reaction temperature of 200–201° C. was then maintained for 8.5 hours. Distillation of the reaction product gave a liquid fraction. This fraction was chilled to about −80° C. to solidify the cyclic fluorocarbon sulfides and the liquid carbon disulfide was removed by decantation. The solidified material was treated with a little benzylamine, which combined with the remaining traces of carbon disulfide. The mixture was allowed to warm up to room temperature and the liquid fluorocarbon sulfides were decanted from the solid carbon disulfide-benzylamine reaction product.

Distillation of the fluorocarbon sulfides at atmospheric pressure gave the following fractions: (1) 40–58° C., 5.8 g.; (2) 58–80° C., 5.0 g.; (3) liquid residue, 0.9 g. Fraction 1 was identified as perfluorothiolane and fractions 2 and 3 as perfluoro-1,4-dithiane by comparison of their nuclear magnetic resonance spectra with those of authentic samples. These fractions were combined with similar fractions from other runs and carefully redistilled, giving pure perfluorothiolane, B.P. 40° C., and pure perfluoro-1,4-dithiane, B.P. 81° C., $n_D^{25}$ 1.3568.

Example VII

Example VI was essentially repeated, except that the reaction medium was carbon tetrachloride (200 ml.).

Distillation of the reaction product gave: (1) a fraction boiling up to 70° C., which on refractionation gave 13.2 g. (23% yield) of perfluorothiolane; (2) a fraction boiling above 70° C. and containing most of the carbon tetrachloride with the perfluoro-1,4-dithiane. The latter was shown by vapor phase chromatography to be present in this fraction in an amount corresponding to a 17% yield.

The products of this invention are capable of a variety of uses. They have high thermal stability and good resistance to oxidation at high temperatures. Since, in addition, they do not support combustion, they are useful as fire-extinguishing liquids. For example, perfluorothiolane and perfluoroselenolane extinguish a burning cotton wad soaked in xylene when sprayed on the fire.

The compounds of this invention have very low toxicity toward mammals. For example, when administered to mice orally, perfluorothiolane has no toxic effects up to 7.5 g./kg. of body weight, and perfluoro-1,4-dithiane has an approximate lethal dose of 2.25 g./kg. This lack of toxicity coupled with the high solvent power and volatility of these compounds makes them useful as aerosol solvents, particularly as solvents for insecticidal compositions used in aerosol bombs, fly sprays and the like.

Both perfluorothiolane and perfluoro-1,4-dithiane possess high activity as soil fungicides and are useful as ingredients of soil fungicidal compositions.

The phosphorus heterocyclics, as has been shown, can be hydrolyzed and oxidized to highly fluorinated phosphonic acids which, as salts or esters, are known to be useful as pickling bath ingredients, flameproofing agents and in other applications (U.S. Patent 2,559,754).

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process of producing fluorocarbon metalloid compounds containing tetrafluoroethylene units chemically bound to a metalloid selected from the group consisting of sulfur, selenium and phosphorus which comprises heating at a temperature of at least 125° C. but not exceeding about 350° C. an intimate mixture of tetrafluoroethylene, iodine and a metalloid selected from the group consisting of sulfur, selenium and phosphorus.

2. Process of producing fluorocarbon sulfur compounds containing tetrafluoroethylene units chemically bound to sulfur which comprises heating at a temperature of at least 125° C. but not exceeding about 350° C. an intimate mixture of tetrafluoroethylene, iodine and sulfur.

3. Process of producing fluorocarbon metalloid compounds containing tetrafluoroethylene units chemically bound to a metalloid selected from the group consisting of sulfur, selenium and phosphorus which comprises heating, at a temperature within the range of 125 to 350° C., an intimate mixture of (a) tetrafluoroethylene, (b) a metalloid selected from the group consisting of sulfur, selenium, and phosphorus, and (c) iodine in amount within the range of 0.001 to 0.5 mole per mole of said metalloid, under a pressure within the range of autogenous to 5,000 atmospheres.

4. Process of producing fluorocarbon sulfur compounds containing tetrafluoroethylene units chemically bound to sulfur which comprises heating, at a temperature within the range of 125 to 350° C., an intimate mixture of tetrafluoroethylene, sulfur and iodine in amount within the range of 0.001 to 0.5 mole per mole of sulfur, under a pressure within the range of autogenous to 5,000 atmospheres.

5. Process of producing fluorocarbon selenium compounds containing tetrafluoroethylene units chemically bound to selenium which comprises heating at a temperature of at least 125° C. but not exceeding about 350° C. an intimate mixture of tetrafluoroethylene, iodine and selenium.

6. Process of producing fluorocarbon phosphorus compounds containing tetrafluoroethylene units chemically bound to phosphorus which comprises heating at a temperature of at least 125° C. but not exceeding about 350° C. an intimate mixture of tetrafluoroethylene, iodine and phosphorus.

7. Process of producing fluorocarbon sulfur compounds containing tetrafluoroethylene units chemically bound to sulfur which comprises heating at a temperature within the range of 200 to 300° C. an intimate mixture of tetrafluoroethylene, iodine and sulfur, thereby obtaining as a resulting product at least one of the fluorocarbon sulfur compounds selected from the group consisting of perfluorothiolane and perfluoro-1,4-dithiane.

8. Process of producing fluorocarbon sulfur compounds containing tetrafluoroethylene units chemically bound to sulfur which comprises heating at a temperature within the range of 125 to 300° C. an intimate mixture of tetrafluoroethylene, iodine and sulfur in a heat-stable, unpolymerizable, essentially neutral liquid reaction media free from carbon-to-carbon unsaturation and which dissolves sulfur to at least 0.5%, thereby obtaining as a resulting product at least one of the fluorocarbon sulfur compounds selected from the group consisting of perfluorothiolane and perfluoro-1,4-dithiane.

9. A fluorocarbon metalloidal heterocyclic compound of the formula

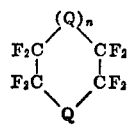

wherein Q is a metalloid selected from the group consisting of sulfur, selenium and phosphorus, provided that when Q is phosphorus, its third valence is satisfied by iodine, and $n$ is a cardinal number from 0 to 1.

10. A fluorocarbon sulfur heterocyclic compound of the formula

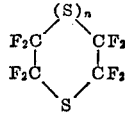

wherein $n$ is a cardinal number of 0 to 1.

11. A fluorocarbon selenium heterocyclic compound of the formula

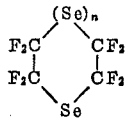

wherein $n$ is a cardinal number of 0 to 1.

12. A fluorocarbon phosphorus heterocyclic compound of the formula

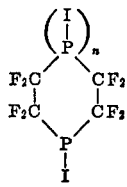

wherein $n$ is a cardinal number of 0 to 1.

13. Perfluorothiolane of the formula

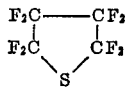

14. Perfluoro-1,4-dithiane of the formula

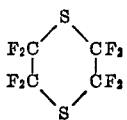

References Cited in the file of this patent

UNITED STATES PATENTS

| | | |
|---|---|---|
| 2,347,182 | Coffman | Apr. 25, 1944 |
| 2,410,401 | Coffman | Oct. 29, 1946 |